(12) United States Patent
Edgar et al.

(10) Patent No.: US 6,614,946 B1
(45) Date of Patent: Sep. 2, 2003

(54) SYSTEM AND METHOD FOR CORRECTING DEFECTS IN DIGITAL IMAGES THROUGH SELECTIVE FILL-IN FROM SURROUNDING AREAS

(75) Inventors: Albert D. Edgar, Austin, TX (US); Thomas A. Dundon, Austin, TX (US)

(73) Assignee: Eastman Kodak Company, Rochester, NY (US)

( * ) Notice: Subject to any disclaimer, the term of this patent is extended or adjusted under 35 U.S.C. 154(b) by 236 days.

(21) Appl. No.: 09/679,990

(22) Filed: Oct. 5, 2000

Related U.S. Application Data

(60) Provisional application No. 60/158,501, filed on Oct. 8, 1999.

(51) Int. Cl.[7] ............................. G06T 5/00; G06T 7/00; H04N 1/409
(52) U.S. Cl. ...................................... 382/275; 382/282
(58) Field of Search ................................ 382/275, 260, 382/261, 262, 264, 282; 358/3.26, 463

(56) References Cited

U.S. PATENT DOCUMENTS

| | | | |
|---|---|---|---|
| 4,260,899 A | 4/1981 | Baker | 250/563 |
| 4,301,469 A | 11/1981 | Modeen et al. | 358/75 |
| 4,302,108 A | 11/1981 | Timson | 356/359 |

(List continued on next page.)

FOREIGN PATENT DOCUMENTS

| | | | | |
|---|---|---|---|---|
| DE | 28 21 868 A1 | 11/1979 | ............ | G01N/21/32 |
| DE | 196 36 867 C1 | 1/1998 | ............ | H04N/5/21 |
| EP | 1 547 811 | 6/1979 | ............ | H04N/3/36 |
| EP | 0 422 220 A1 | 4/1991 | ............ | A61B/6/03 |
| EP | 0 482 790 B1 | 4/1992 | ............ | H04N/1/40 |
| EP | 0 527 097 A2 | 2/1993 | ............ | H04N/1/40 |
| EP | 0 569 142 A1 | 11/1993 | ............ | H04N/5/253 |
| EP | 0 624 848 A2 | 11/1994 | ............ | G06F/15/68 |
| EP | 0 699 753 A2 | 8/1995 | ............ | H04N/1/407 |
| EP | 0 716 538 A2 | 6/1996 | ............ | H04N/1/50 |
| EP | 0 751 670 A2 | 1/1997 | ............ | H04N/1/10 |
| EP | 0 768 621 A2 | 4/1997 | ............ | G06T/5/20 |
| EP | 0 794 454 A2 | 9/1997 | ............ | G03B/27/73 |
| EP | 0 816 833 A2 | 1/1998 | ............ | G01N/21/88 |
| EP | 0 816 833 A3 | 8/1998 | ............ | G01N/21/88 |
| EP | 0 893 914 A2 | 1/1999 | ............ | H04N/5/253 |
| EP | 930498 | 7/1999 | | |
| GB | 2 283 633 A | 5/1995 | ............ | H04N/5/262 |
| JP | 4-291139 | 10/1992 | ............ | G01N/21/89 |
| JP | 11-185028 | 7/1999 | | |
| JP | 11185028 | 7/1999 | ............ | G06T/1/00 |
| JP | 2000-13604 | 1/2000 | ............ | H04N/1/409 |
| JP | 2000-196813 A | 7/2000 | | |
| WO | WO 84/02019 | 5/1984 | ............ | G06F/15/20 |
| WO | WO 89/06890 | 7/1989 | ............ | H04N/3/36 |
| WO | WO 90/01240 | 2/1990 | ............ | H04N/1/40 |

(List continued on next page.)

OTHER PUBLICATIONS

*New Adaptive Vector Filter Based on Noise Estimate*, Mei Yu, et al., IEICE Trans. Fundamentals, vol. E82, No. 6, Jun., 1999.

*A Robust Method for Parameter Estimation of Signal–Dependent Noise Models in Digital Images*, B. Aiazzi, et al., IEEE, 1997, pp. DSP 97—601–604.

*A Regularized Iterative Image Restoration Algorithm*, Aggelos K. Katsaggelos, et al., IEEE, 1991, pp. 914–929.

(List continued on next page.)

Primary Examiner—Scott Rogers
(74) Attorney, Agent, or Firm—Dinsmore & Shohl LLP

(57) ABSTRACT

A system and method for correcting defects in an image. A correction area surrounding the defective pixel is dynamically chosen to include a predetermined percentage of non-defective pixels. The percentage is varied as a function of the size of the surrounding region, such that the percentage decreases as the size of the region increases. The shape of the surrounding area may be varied to further enhance the correction procedure. A center of gravity is maintained around the defective pixel by defining subregions surrounding the pixel.

32 Claims, 3 Drawing Sheets

U.S. PATENT DOCUMENTS

| | | | |
|---|---|---|---|
| 4,462,860 A | 7/1984 | Szmanda | 156/626 |
| 4,670,779 A | 6/1987 | Nagano | 358/75 |
| 4,677,465 A | 6/1987 | Alkofer | 358/80 |
| 4,680,638 A | 7/1987 | Childs | 358/214 |
| 4,700,229 A | 10/1987 | Herrmann et al. | 358/166 |
| 4,775,238 A | 10/1988 | Weber | 356/431 |
| 4,796,061 A | 1/1989 | Ikeda et al. | 355/73 |
| 4,814,630 A | 3/1989 | Lim | |
| 4,821,114 A | 4/1989 | Gebhardt | |
| 4,845,551 A | 7/1989 | Matsumoto | 358/80 |
| 4,933,566 A | 6/1990 | Masaaki et al. | 250/563 |
| 4,937,720 A | 6/1990 | Kirchberg | 363/41 |
| 4,969,045 A | 11/1990 | Haruki et al. | 358/228 |
| 4,972,091 A | 11/1990 | Cielo et al. | 250/562 |
| 4,989,973 A | 2/1991 | Noso et al. | 356/239 |
| 4,994,918 A | 2/1991 | Lingemann | 358/214 |
| 5,003,379 A | 3/1991 | Moore, Jr. et al. | 358/54 |
| 5,010,401 A | 4/1991 | Murakami et al. | 358/136 |
| 5,047,968 A | 9/1991 | Carrington et al. | 364/574 |
| 5,058,982 A | 10/1991 | Katzir | 385/33 |
| 5,091,972 A | 2/1992 | Kwon et al. | 382/54 |
| 5,097,521 A | 3/1992 | Massmann | 382/54 |
| 5,149,960 A | 9/1992 | Dunne et al. | 250/226 |
| 5,155,596 A | 10/1992 | Kurtz et al. | 358/214 |
| 5,200,817 A | 4/1993 | Birnbaum | 358/80 |
| 5,266,805 A | 11/1993 | Edgar | 250/330 |
| 5,267,030 A | 11/1993 | Giorgianni et al. | 358/527 |
| 5,291,286 A | 3/1994 | Murakami et al. | 348/469 |
| 5,311,310 A | 5/1994 | Jozawa et al. | 348/416 |
| 5,317,420 A * | 5/1994 | Kuwahara | 382/275 |
| 5,335,086 A | 8/1994 | Kitamura | 358/431 |
| 5,371,542 A | 12/1994 | Pauli et al. | 348/262 |
| 5,447,811 A | 9/1995 | Buhr et al. | 430/20 |
| 5,448,380 A | 9/1995 | Park | 358/520 |
| 5,452,018 A | 9/1995 | Capitant et al. | 348/651 |
| 5,465,155 A | 11/1995 | Edgar | 385/500 |
| 5,465,163 A | 11/1995 | Yoshihara et al. | 358/444 |
| 5,477,345 A | 12/1995 | Tse | 358/500 |
| 5,509,086 A | 4/1996 | Edgar et al. | 382/167 |
| 5,516,608 A | 5/1996 | Hobbs et al. | 430/30 |
| 5,552,904 A | 9/1996 | Ryoo et al. | 358/518 |
| 5,561,611 A | 10/1996 | Avinash | 364/553 |
| 5,565,931 A | 10/1996 | Girod | 348/675 |
| 5,568,270 A | 10/1996 | Endo | 358/298 |
| 5,581,376 A | 12/1996 | Harrington | 358/518 |
| 5,582,961 A | 12/1996 | Giorgianni et al. | 430/508 |
| 5,583,950 A | 12/1996 | Prokoski | 382/212 |
| 5,589,887 A | 12/1996 | Wischermann | 348/616 |
| 5,608,547 A | 3/1997 | Nakatani et al. | 358/505 |
| 5,641,596 A | 6/1997 | Gray et al. | 430/21 |
| 5,666,443 A | 9/1997 | Kumashiro | 382/266 |
| 5,673,336 A | 9/1997 | Edgar et al. | 382/167 |
| 5,721,624 A | 2/1998 | Kumashiro et al. | 358/450 |
| 5,726,773 A | 3/1998 | Mehlo et al. | 358/474 |
| 5,729,631 A | 3/1998 | Wober et al. | 382/232 |
| 5,771,107 A | 6/1998 | Fujimoto et al. | 358/464 |
| 5,808,674 A | 9/1998 | Adams, Jr. et al. | 348/273 |
| 5,892,595 A | 4/1999 | Yamakawa et al. | 358/530 |
| 5,923,042 A | 7/1999 | Mietta et al. | 250/559.06 |
| 5,930,388 A | 7/1999 | Murakami et al. | 382/167 |
| 5,963,662 A | 10/1999 | Vachtsevanos et al. | 382/150 |
| 5,969,372 A | 10/1999 | Stavely et al. | 250/559.42 |
| 5,979,011 A | 11/1999 | Miyawaki et al. | 15/308 |
| 5,982,941 A | 11/1999 | Loveridge et al. | 382/260 |
| 5,982,951 A | 11/1999 | Katayama et al. | 382/284 |
| 5,991,444 A | 11/1999 | Burt et al. | 382/232 |
| 6,005,987 A | 12/1999 | Nakamura et al. | 382/294 |
| 6,057,040 A | 5/2000 | Hage | 428/447 |
| 6,075,905 A | 6/2000 | Herman et al. | 382/284 |
| 6,078,051 A | 6/2000 | Banton et al. | 250/341.1 |
| 6,078,701 A | 6/2000 | Hsu et al. | 382/294 |
| 6,101,273 A | 8/2000 | Matama | 382/169 |
| 6,128,416 A | 10/2000 | Oura | 382/284 |
| 6,239,886 B1 | 5/2001 | Klasser et al. | 358/518 |
| 6,529,618 B1 * | 3/2003 | Ohara et al. | 382/132 |

FOREIGN PATENT DOCUMENTS

| | | | |
|---|---|---|---|
| WO | WO 91/09493 | 6/1991 | H04N/5/127 |
| WO | WO 92/05469 | 4/1992 | G03B/27/53 |
| WO | WO 95/15530 | 6/1995 | G06F/17/14 |
| WO | WO 97/16028 | 5/1997 | H04N/7/30 |
| WO | WO 98/31142 | 7/1998 | H04N/5/253 |
| WO | WO 98/34397 | 8/1998 | |
| WO | WO 99/40729 | 8/1999 | H04N/9/11 |
| WO | WO 01/48694 | 7/2001 | G06T/5/00 |

OTHER PUBLICATIONS

*Adaptive Fourier Threshold Filtering: A Method to Reduce Noise and Incoherent Artifacts in High Resolution Cardiac Images*, M. Doyle, et al., 8306 Magnetic Resonance in Medicine, May, 31, 1994, No. 5, Baltimore, MD., pp. 546–550.

*Anisotropic Spectral Magnitude Estimation Filters for Noise Reduction and Image Enhancement*, Til Aach, et al., IEEE, 1996, pp. 335–338.

*Adaptive–neighborhood filtering of images corrupted by signal–dependent noise*, Rangaraj M. Rangayyan et al., Applied Optics, vol. 37, No. 20, Jul. 10, 1998, pp. 4477–4487.

*Digital Imaging Equipment White Papers*, Putting Damaged Film on Ice, A Technical Discussion of Advances in Digital Imaging, Nikon Corporation, http://www.nikonusa.com/reference/whitepapers/imaging/ditechdisc.html, Aug. 5, 1999.

*Local Cosine Transform—A Method for the Reduction of the Blocking Effect in JPEG*, Gil Aharoni, et al., Journal of Mathematical Imaging and Vision, 3, 7–38, 1993.

*Digital ICE*, Applied Science Fiction, Inc., http://www.asf.com/html/o_products/iceprod.html. Aug. 5, 1999.

*About Digital ICE Technology*, Applied Science Fiction, Inc., http://www.asf.com/html/o_products/icetech.html. Aug. 5, 1999.

*2–D Adaptive Volterra Filter for 2–D Nonlinear Channel Equalisation and Image Restoration*, J.N. Lin, et al., Electronic Letters, vol. 28, No. 2, Jan. 16, 1992, pp. 180–182.

* cited by examiner

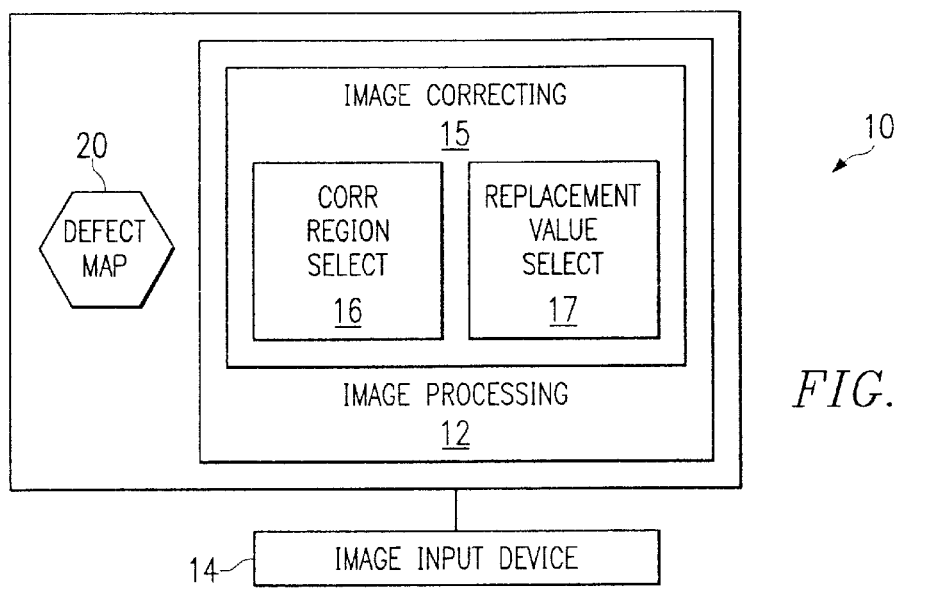
FIG. 1
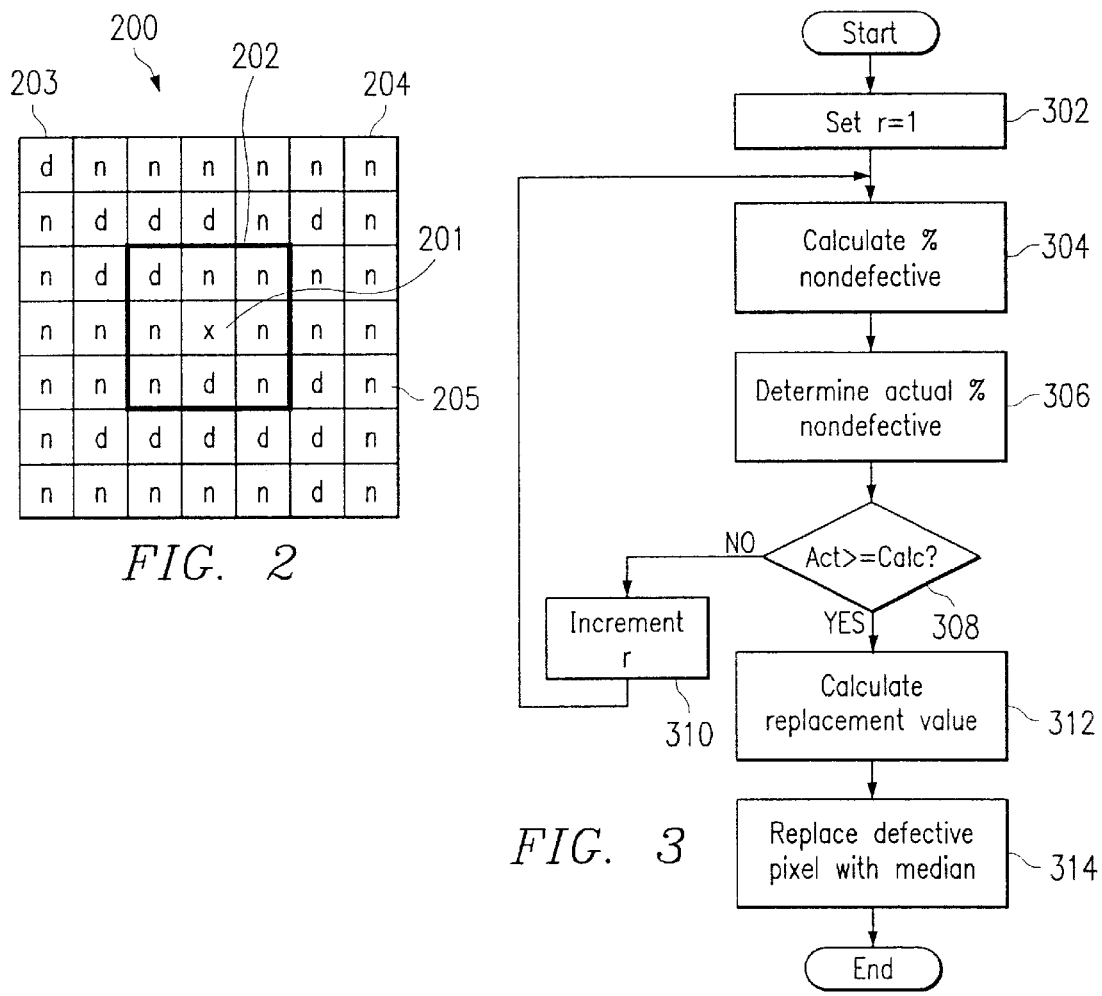
FIG. 2
FIG. 3

SYSTEM AND METHOD FOR CORRECTING DEFECTS IN DIGITAL IMAGES THROUGH SELECTIVE FILL-IN FROM SURROUNDING AREAS

CROSS REFERENCE TO RELATED APPLICATIONS

This application claims priority under 35 U.S.C. §119 of U.S. Provisional Application Serial No. 60/158,501 filed Oct. 8, 1999. This application is also related to the Potucek et al U.S. application Ser. No. 09/686,719 filed Oct. 10, 2000, entitled Method and Apparatus for Differential Illumination Image-Capturing and Defect Handling, and the Ford et al U.S. application Ser. No. 09/552,473 entitled Scanner and Method.

BACKGROUND OF THE INVENTION

1. Field of the Invention

The present invention relates to image processing and, particularly, to an improved system and method for correcting defects in images.

2. Description of the Related Art

Digitized images often include imperfections that are not present in the original image. One cause of such defects may be the components of the image capturing system. For example, a scanning surface, or platen, may contain scratches and other optical path obstructions. These optical path obstructions are digitized along with the original image and appear as imperfections in the digitized image.

Another cause of imperfections is defects within the physical medium of the image. For example, a photograph, film negative or other physical medium may be scratched or deformed despite careful handling. In addition, dust, hair, smudges, and the like may be deposited on the surface of the physical medium and will be digitized along with the original image. These defects will also appear in the digitized image as defects.

Conventional software programs are available to identify such defects. Some programs simply identify anything in the image with a certain characteristic, such as high frequency content, as being defective. Other programs allow the user to manually specify the defects. The identification of such defects can be summarized in a defect map. A binary defect map simply marks pixels in an image as defective or non-defective. Other systems facilitate the creation of a continuous defect map, wherein each pixel is marked with a defect value proportional to the severity of any defect at the pixel.

Once a pixel has been marked as defective, conventional imaging programs replace the defective pixel with a replacement amplitude value determined from amplitudes of the surrounding pixels within a predetermined area. In particular, such programs define a fixed area around a defective pixel and then calculate a mean average of the amplitude values of the pixels within that area. This value is then used to fill the defective pixel.

Conventional defect correction programs have several technical disadvantages. For example, conventional defect correction programs generally employ a fixed correction area, wherein a significant number of defective pixels are included, which are then included in the correction averaging calculation. This, in turn, can cause defects in the corrected image.

SUMMARY OF THE INVENTION

These and other drawbacks in the prior art are overcome in large part by a system and method for correcting defects in an image according to the present invention. In accordance with one implementation of the present invention, a method for correcting images is provided. In accordance with this implementation, the correction area surrounding the defective pixel is dynamically chosen to include a predetermined percentage of non-defective pixels. The percentage is varied as a function of the size of the surrounding region, such that the percentage decreases as the size of the region increases.

According to another implementation of the present invention, the shape of the surrounding area may be varied to further enhance the correction procedure. According to this method, subregions surrounding the defective pixel are defined. Once the subregions surrounding the pixel has been defined, the pixel is corrected, for example, by choosing a median average of the pixel amplitudes within the subregions.

Thus, the defect correcting system and method provides an improved method for selecting a replacement value for a defective pixel. This results in a clearer final image having fewer defects than in many conventional imaging systems.

BRIEF DESCRIPTION OF THE DRAWINGS

A better understanding of the invention is obtained when the following detailed description is considered in conjunction with the following drawings, in which like reference numerals represent like features, in which:

FIG. 1 is a block diagram of an imaging system employing an image correcting system in accordance with the present invention;

FIG. 2 is an exemplary defect map showing dynamic correction region selection in accordance with the present invention;

FIG. 3 illustrates a flowchart according to one implementation of the present invention;

DETAILED DESCRIPTION OF THE INVENTION

Figure 4:
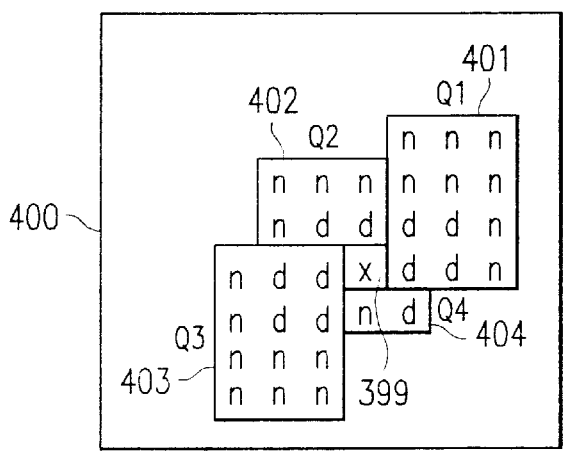
FIG. 4 illustrates correction subregions according to an implementation of the present invention.

FIGS. 1–7 illustrate an image defect correcting system and method of operation. As will be discussed in greater detail below, an image defect correcting system according to the present invention dynamically determines a correction area surrounding defective pixels. The correction region is chosen to contain a predetermined percentage or number of non-defective pixels, which varies with the size of the region. In addition, the shape of the correction region may be varied to enhance the image correction process.

Turning now to the drawings and, with particular attention to FIG. 1, an exemplary processing system 10 including image processing functionality according to the present invention is shown. As will be described in greater detail below, the processing system 10 provides enhanced image correction according to the present invention by varying the size and shape of a correction area around a pixel to be corrected. The processing system 10 may be embodied as a known computer system, such as an IBM RS 6000 workstation, an Apple G4 computer, or as an IBM PC or PC-compatible computer.

The processing system 10 implements an image processing system 12, such as a computer program. The processing system 10 may further include an image input device 14. The image input device 14 may be embodied as a scanner, digital camera, or any other device suitable for providing an image to be processed, such as a mass storage device. It is noted that the image processing system 10 may be embodied as part of the image input device 14, rather than, as illustrated, a separate unit. Thus, the figures are exemplary only. It is further noted that an exemplary image processing system 10 is the image processing system described in co-pending U.S. patent application Ser. No. 09/686,719, titled Method and Apparatus for Differential-Illumination Image Capturing and Defect Handling, Attorney Docket No. ASF98-098-PA-US which is hereby incorporated by reference in its entirety as if fully set forth herein.

The image processing system 12 includes an image correcting system 15 including a correction region selection unit 16 and a replacement value selection unit 18. As will be discussed in greater detail below, the image correcting system 15 uses a defect map 20 to perform image correction. One method for generating a defect map is described in U.S. Pat. No. 5,266,805, which is hereby incorporated by reference in its entirety as if fully set forth herein. This method transmits infrared light at one surface of a film. A corresponding digitized infrared image is captured on this opposite side. Imperfections are identified because they substantially reduce or totally occlude the infrared light. The digitized infrared image thus provides an accurate map of the location and shape of image defects. Other methods of generating defect maps are known and the invention is not intended to be limited to any particular method. Thus, the above discussion is by way of example only.

In the case of a binary defect map, pixels are classified according to a binary defectiveness metric as defective or non-defective. In the case of a continuous defect map, pixels are characterized by continuous defectiveness metrics. For example, one such defectiveness metric is a level of defectiveness. If values for defectiveness are normalized between 0 for defective and 1 for non-defective, a pixel with a value of 0.5 would be considered half defective. An alternative defectiveness metric is correctability, which is a metric indicating how susceptible a pixel is to a particular method for correction. For example, a pixel might be assigned a correctability of 1, meaning 100% correctable, if it can be corrected using the infrared subtractive technique, even though the defectiveness for that pixel may be only 0.5. For sake of simplicity, the following discussion will use defectiveness terminology, it being understood that other defectiveness metrics may be employed.

The image correcting system 15 selects a correction area proximate to each defective pixel. In one implementation, the correction area is selected to contain a predetermined percentage of non-defective pixels. In a specific implementation, the percentage varies as a function of the size of the surrounding area, so that the percentage decreases as the size of the region increases. For example, in one implementation, the following formula is used to calculate the percentage of non-defective pixels:

% non-defective pixels $(NDP)=100(1/(1+A/25))$, (Equation 1)

where:

$A=(2r+1)^2$ r=radius of the region

In this implementation, the term radius is used loosely since, generally, the area in question is square. The sum of non-defective pixels for the case of a binary defect map can be calculated as:

$$ND = \sum_{k=1}^{A} P_k \qquad \text{(Equation 2)}$$

where:

$P_k=1$ if the $k^{th}$ pixel is non-defective $p_k=0$ if the $k^{th}$ pixel is defective To determine when the area in question is suitable for the next stage of correction, the following condition is tested:

$ND>=A*NDP/100$ (Equation 2.5)

If the condition in Equation 2.5 is satisfied, then the area is of sufficient size for use in the next stage of correction. If not, then the radius is incremented and the required percentage and actual sum of non-defective pixels (ND) are recalculated. For example, for r=0, the required percentage is nearly 100% and for r=2, the required percentage is 50%.

Use of this method is illustrated more particularly, by way of example, in FIG. 2. FIG. 2 illustrates a defect map 200. A pixel X to be corrected is denoted 201, defective pixels 203 are denoted d, and non-defective pixels 205 are denoted n. If r is chosen to be 1, then, using Equation 1, a box 202 surrounding the pixel 201 needs 74% (or at least 7 out of 9) non-defective pixels in order to satisfy Equation 2.5. For r=1 and r=2, the criteria are not met. However, if r is chosen to be 3, Equation 1 indicates that box 204 requires only 33% (or at least 17 out of 49) non-defective pixels, and we see that the condition of Equation 2.5 is satisfied.

In the case of a continuous defect map, a pixel reliability is defined, which is the inverse of a pixel s defect value. The pixel reliability is used as a gauge for a pixel s suitability for use as a substitute for the defective pixel in question. For example, in one implementation, a pixel s reliability is calculated using the following formula:

$R=1-K*D$ (Equation 3)

Where:
  R is the reliability
  K is a proportionality constant determined empirically
  D is the defect value The range of the pixel s defect value may be set from 0 (completely non-defective) to 1 (completely defective). If K=1, it is seen that R varies from 1 (completely reliable) to 0 (completely unreliable). For K>1, the lowest value of R may be limited to 0.

In determining the appropriate size of the correction area for a continuous defect map, Equation 1 above may be used for determining the required percentage of non-defective pixels. The sum of non-defective pixels, ND, now becomes the sum of each pixel s reliability:

$ND=$ where $R_k$ is the $k^{th}$ pixel s reliability (Equation 4)

As discussed above, once the correction area has been determined, the amplitudes of the pixels in the correction area are used to determine a corrected amplitude value for the pixel which is to be corrected. A variety of methods for choosing the correction value may be employed. For example, the amplitudes of the pixels in the correction region may be averaged to determine the correction value.

In an implementation employing a binary defect map, only the amplitudes of the non-defective pixels are used to determine the correction amplitude value. For example, if the correction areas 202 or 204 of FIG. 2 define binary defect maps, then the amplitudes of the defective pixels 203 are ignored in determining the correction value. Instead, only the amplitudes of the non-defective pixels 205 are used. According to one implementation, the median amplitude of all non-defective pixels is used as a substitute for the pixel 201. Other mathematical techniques may be employed. For example, cubic spline techniques or similar mathematical models may be implemented.

If the defect map is a continuous defect map, then an amplitude value is chosen based on an averaging of the values of pixels in the surrounding region, taking into account or weighting their reliabilities or defectiveness metrics. Thus, the value may be obtained by taking a mean or median average of those pixels having a particular reliability.

A flowchart illustrating operation of one implementation of the present invention is shown in FIG. 3. This flowchart represents the steps involved in correcting one pixel in the image, and as such would be repeated for each pixel in the entire image. In one implementation, only the original pixel values (and not the newly corrected pixel values) are used in any of these steps. In a step 302, the image correcting system 14 sets the index value r equal to a predetermined index, such as 1. In a step 304, the image correcting system 14 calculates the percentage of non-defective pixels allowed for that particular value of r. Alternatively, the image correcting system 14 may access a lookup table (not shown) which contains a list of values of r and corresponding percentages. Then, in a step 306, the image correcting system 14 determines the actual percentage of non-defective pixels. For example, the image correcting system 14 may count the non-defective pixels within the region defined by r. The actual percentage of non-defective pixels is compared to the calculated percentage of non-defective pixels in a step 308. If the actual percentage is not greater than or equal to the calculated percentage, then in a step 310, the index r is incremented and the program loops back to step 304. However, if the actual percentage is greater than or equal to the calculated percentage, then in a step 312, a correction value is determined by the image correcting system 14. For example, in the case of the binary defect map, the amplitude values of the non-defective pixels are used to determine a median average. In the case of a continuous defect map, the values of all pixels are used to determine the median. Once the correction value is determined, the image correcting program replaces the defective pixel value with the calculated correction amplitude value, in a step 314.

As noted above, the shape of the area surrounding the defective pixel may also be varied. The shape is varied while maintaining a center of gravity on the defective pixel (i.e., the defective pixel is maintained at the center of subregions weighted according to size and number of defective pixels). To maintain the center of gravity, subregions are created around the defective pixel which contain predetermined percentages of non-defective pixels. According to one implementation, the subregions are defined as rectangular quadrants of dimension r×(r+1), where r is the effective radius for the quadrant. Although the subregions are described in terms of four rectangular regions, the subregions may have any of a variety of shapes. The subregions can have effective radii which differ from one another depending upon the proportion of defective pixels within the particular subregion. For example, as shown in FIG. 4, a map 400 surrounding the defective pixel 399 (X)may be divided into subregions 401–404 (Q1–Q4). For subregion 401 (Q1), r=3; for subregion 402 (Q2), r=2; for subregion 403 (Q3), r=3; and for subregion 404 (Q4), r=1.

In one implementation, the center of gravity is maintained by determining the number of non-defective pixels for a portion of each subregion associated with a particular increment of r. The sum of non-defective pixels (ND) is multiplied by its value of r and added vectorially to similar products from other subregions. The center of gravity is maintained by constraining the vector sum to be zero. For example, in the case of quadrants, +i is assigned to quadrant 401 (Q1), −i can be assigned to quadrant 403 (Q3), +j to quadrant 402 (Q2), and j to quadrant 404 (Q4), where i is the unit vector for the positive x-axis, and j is the unit vector for the positive y-axis. If the vector sum is nonzero, the radius is incremented for the appropriate quadrant to achieve the proper center of gravity.

The following equation is used to determine the vector sum:

$$VS = r_1 ND_{Q1}\hat{i} - r_3 ND_{Q3}\hat{i} + r_2 ND_{Q2}\hat{j} - r_4 ND_{Q4}\hat{j} \quad \text{Equation 5}$$

For a binary defect map, ND for each quadrant is calculated using an equation similar to Equation 2 (i.e., the area A is now the area of the quadrant). For a continuous defect map, ND for each quadrant is calculated using an equation similar to Equation 4. In addition, a modified version of Equation 1, as seen below, is used to constrain the appropriate total percentage of non-defective pixels:

$$NDP = 100 * (1/(1 + \Sigma A/25)) \quad \text{Equation 6}$$

As can be seen, the area A in Equation 1 is now the sum of the areas of each subregion. In certain implementations, the sum of the areas can include the central pixel, i.e., for r=0.

For example, in FIG. 4, VS=24i−24i+8j−j=7j, and NDP= 43.1% (A=33). It is seen that Equation 2.5 is satisfied. If Equation 2.5 had not been satisfied, the index r would be incremented, and the above-described calculations undertaken again to determine whether the region(s) now satisfy the criteria of Equation 2.5. It is noted that a maximum number of iterations may constrain the image correction system to prevent hysteresis. Moreover, in certain cases, it may not be necessary for the vector sum VS to equal zero (0). Satisfactory image correcting performance may be achieved if VS meets a predetermined threshold value.

Figure 5:
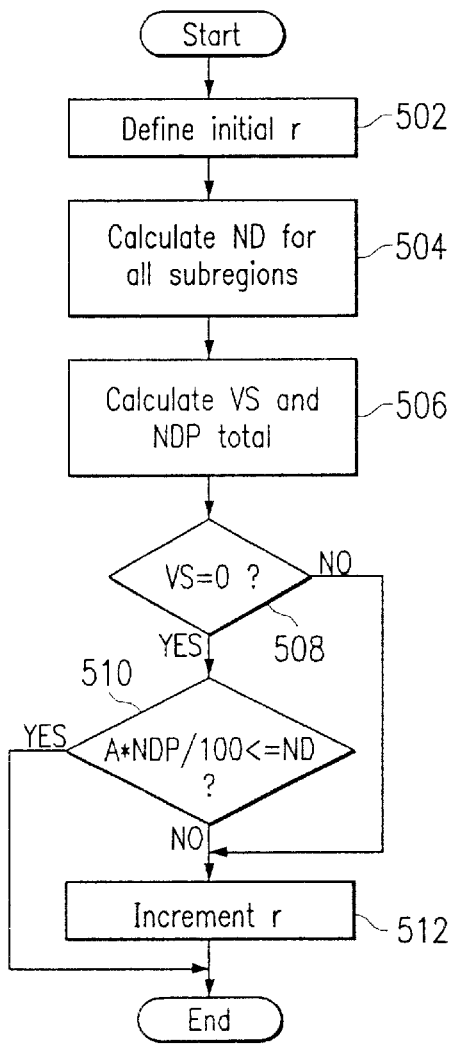
FIG. 5 illustrates a flowchart of subregion selection according to an implementation of the present invention.

Turning now to FIG. 5, a flowchart illustrating operation of this implementation of the invention is shown. In a step 502, correction region selection unit 16 defines an initial index r for each of a predetermined number of subregions. Then, in a step 504, using a defect map 20, the correction region selection unit 16 calculates ND for all of the subregions. In a step 506, the correction region selection unit 16 calculates VS and NDP In a step 508, the correction region selection unit 16 determines whether VS=0 (or is below a threshold value). If not, then the value of r for one or more of the subregions is incremented, in a step 512, and the system cycles back to step 504. If, in step 508, VS=0, then in a step 510, it is determined whether Equation 2.5 is satisfied. If not, then one or more values of r are incremented and the system returns to step 504. Otherwise, the selection of the subregions is complete. As discussed above, the number of iterations of the process may be constrained to a particular number.

Another method of growing separate subregions is to constrain each subregion to contain above a threshold number of non-defective pixels. Thus, in the case of quadrants, each quadrant contains $\frac{1}{4}^{th}$ of the total number of non-defective pixels. Initially, each quadrant is the same size. The sum of all non-defective pixels is then determined, and $\frac{1}{4}$ of that value is used as a threshold for the next iteration of quadrant growth. If a quadrant has already contributed more than this threshold, it is not grown (i.e., r is not increased). Otherwise, r is incremented by 1. When all four quadrants are evaluated in this manner, a new sum of non-defective pixels is calculated and the process repeats. When the total number of non-defective pixels satisfies the requirement of Equation 1, then the process is finished with each quadrant contributing equally. In the case of a continuous defect map, the sum in question is the sum of reliability values for each pixel.

Figure 6A:
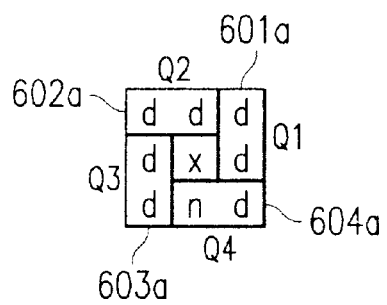
FIGS. 6A and 6B illustrate subregion selection according to an implementation of the present invention.
Figure 6B:
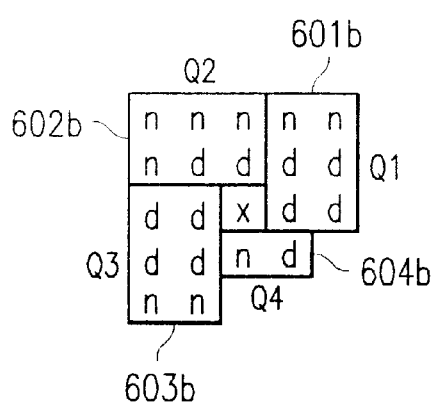

For example, FIG. 6A and 6B illustrate quadrant growth on the map of FIG. 4. Initially, as shown in FIG. 6A, the radius, r, is set to 1. As shown, ND=1, and the quadrant threshold T=ND/4=0.25, and NDP=74%. Quadrants 601a–604a are of dimension 1×2; all quadrants except quadrant 604a have two defective pixels. In this case, quadrant 601d (Q4) is not grown, but quadrants 601a–601c (Q1–Q3) are. The result is seen in FIG. 6B. In this case, ND=9, and the threshold T=2.25. As can be seen, of the newly-grown quadrants 601b–603b, only quadrant 602b has a number of non-defective pixels above the threshold. The process continues until all quadrants are above the associated threshold.

Figure 7:
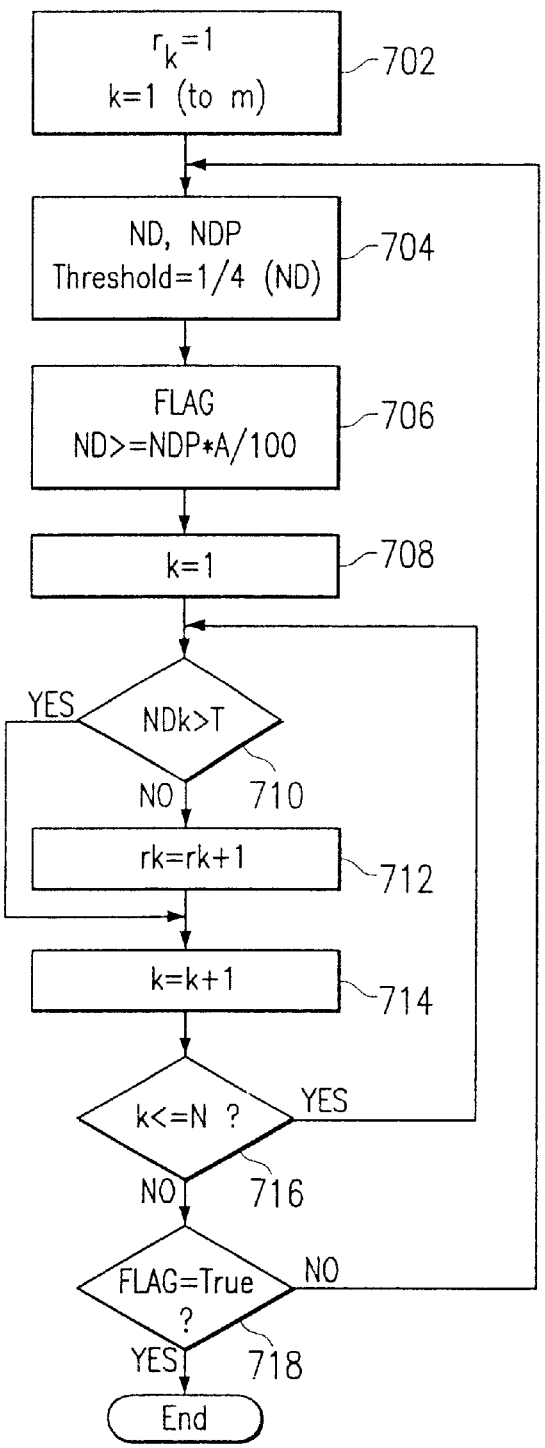
FIG. 7 illustrates a flowchart of subregion selection according to another implementation of the invention.

This process is illustrated with reference to FIG. 7. In a step 702, the radius $r_k$ for each subregion, k=1 (to m) is set to an initial value, such as 1. In a step 704, the system calculates the sum of non-defective pixels (ND), the total required percentage (NDP), and the threshold required of non-defective pixels per subregion (T). In a quadrant-based system, T=ND/4, the total number of subregions m=4, and the index k (in $r_k$) varies from m=1 to m=4. Next, in a step 706, the sum of non-defective pixels (ND) is compared to the required percentage (NDP), as in Equation 2.5. If this condition is satisfied, a flag, F, is set to TRUE. Otherwise, this flag is set to FALSE. Next, in a step 708, the index k is set to 1. In step 710, the sum of non-defective pixels for the quadrant associated with k ($ND_k$) is calculated and compared to the threshold, T. If $ND_k$ is less than T, then the radius for that quadrant ($r_k$) is incremented in step 712. Otherwise, index k is incremented in step 714. The new value of index k is compared against m in step 716 and if less than or equal to m, control is returned to step 710. Otherwise, step 716 checks the flag F. If F is FALSE, control is returned to step 704. Otherwise, the process is finished for the current pixel.

Once the subregions have been selected, the correction value may be chosen in a manner similar to that discussed above. However, in another implementation, a substitute value for the amplitude of the pixel 399 (FIG. 4) is calculated by first determining a figure of merit for each pixel in a subregion once the size and shape of the subregions are determined. The figure of merit indicates the appropriateness of using that pixel as a substitute. One particular figure of merit is shown below:

$$FM_k = R_k / r_k \qquad \text{Equation 7}$$

where, for the $k^{th}$ pixel:
$FM_k$ is the figure of merit;
$R_k$ is the reliability;
$r_k$ is the radius.

Within each subregion, the pixel with the highest figure of merit is selected.

The figures of merit for each subregion are then summed:

$$FM_t = \sum_{k=1}^{N} FM_k \qquad \text{(Equation 8)}$$

where:
$FM_k$ is the figure of merit for the selected pixel from the $k^{th}$ subregion;
$FM_t$ is the total figure of merit.
N is the total number of subregions (N=4 for quadrants)
Then, an amplitude value for the defective pixel is chosen according to the following equation:

$$S = \sum_{k=1}^{N} P_k * FM_k / FM_t \qquad \text{(Equation 9)}$$

where:
$P_k$ is the amplitude of the selected pixel from the $k^{th}$ subregion;
S is the substitute value.

When using quadrants, the summations in Equations 8 and 9 go to 4. (i.e., Q=4).

The invention described in the above detailed description is not intended to be limited to the specific form set forth herein, but is intended to cover such alternatives, modifications and equivalents as can reasonably be included within the spirit and scope of the appended claims. To aid the Patent Office and any readers of any patent issued on this application in interpreting the claims appended hereto, applicants wish to note that they do not intend any of the appended claims to invoke paragraph 6 of 35 U.S.C. Sec. 112 as it exists on the date of filing hereof unless the words "means for" or "step for" are used in the particular claim.

What is claimed is:

1. A method for correcting images, comprising:
   selecting an area proximate at least one defective pixel, said area selected to include a variable number of pixels having a defectiveness metric above a predetermined threshold; and
   replacing said defective pixel with a pixel having a value derived from values of one or more selected pixels within said area.

2. A method according to claim 1, said replacing said defective pixel including determining an average value of said selected pixels within said area.

3. A method according to claim 2, including deriving a reliability from selected pixels within said area.

4. A method according to claim 3, said replacing said defective pixel including determining a median of non-defective pixels within said area.

5. A method according to claim 4, including weighting the median with a defectiveness metric.

6. A method according to claim 3, said determining an average value including determining a mean of selected pixels within said area.

7. A method according to claim 6, including weighting the average with a defectiveness metric.

8. A method according to claim 1, said selecting an area including selecting one or more subregions chosen to include a variable percentage of non-defective pixels.

9. A method according to claim 8, said replacing including averaging among selected pixels in said subregions.

10. A method according to claim 9, said averaging including averaging among said subregions weighted so that a center of gravity is coincident with said defective pixel.

11. A method according to claim 10, wherein said on or more subregions define quadrants.

12. An image processing system, comprising:
   a correction region selection unit operable to dynamically select a correction area around at least one defective pixel, said area including a variable level of non-defective pixels within a defectiveness metric above a predetermined threshold; and
   replacing said defective pixel with a pixel having, a value derived from values of one or more selected pixels within said area.

13. An image processing system according to claim 12, said replacement value selection unit configured to determine an average value of said selected pixels within said area.

14. An image processing system according to claim 13, said replacement value selection unit configured to derive a reliability from selected pixels within said area.

15. An image processing system as recited in claim 12, wherein said image processing system comprises a scanner.

16. An image processing system, comprising:
   a correction region selection unit operable to dynamically select a correction area around at least one defective pixel, said area including a variable level of non-defective pixels; and
   a replacement value selection unit configured to (i) select a replacement value for said defective pixel, wherein said replacement value selection unit configured to determine an average value of the selected pixels within said area, (ii) derive a reliability from selected pixels within said area, and (iii) determine a median of non-defective pixels within said area.

17. An image processing system according to claim 16, said replacement value selection unit configured to weight the median with a defectiveness metric.

18. An image processing system according to claim 17, said replacement value selection unit configured to determine a mean of selected pixels within said area.

19. An image processing system according to claim 16, said replacement value selection unit configured to weight the average with a defectiveness metric.

20. An image processing system, comprising:
   a correction region selection unit operable to dynamically select a correction area around at least one defective pixel, said area including a variable level of non-defective pixels; and
   a replacement value selection unit configured to select a replacement value for said defective pixel, wherein said replacement value selection unit configured to select one or more subregions chosen to include a variable percentage of non-defective pixels.

21. An image processing system according to claim 20, said replacement value selection unit configured to average among selected pixels in said subregions.

22. An image processing system according to claim 21, said replacement value selection unit configured to average among said subregions weighted so that a center of gravity s coincident with said defective pixel.

23. An image processing system according to claim 22, wherein said on or more subregions define quadrants.

24. An image processing system, comprising:
   a correction region selection unit operable to dynamically select a correction area around at least one defective pixel, said area including a variable level of non-defective pixels; and
   a replacement value selection unit configured to select a replacement value for said defective pixel, wherein said image processing system comprises a reflective-type scanner.

25. A method for correcting images, comprising:
   selecting one or more variably-sized regions proximate a defective pixel;
   replacing said defective pixel with a pixel having a value derived from values of one or more of pixels within said one or more variably-sized regions; and
   selecting said one or more regions to have a predetermined level of pixels having a defectiveness metric above a predetermined threshold.

26. A method according to claim 25, said replacing said defective pixel comprising determining an average value of said values of said one or more pixels.

27. A method according to claim 25, including deriving a reliability from selected pixels within said one or more variably-sized regions.

28. A method according to claim 27, said replacing said defective pixel including determining a median of non-defective pixels within said one or more variably-sized regions.

29. A method according to claim 28, including weighting the median with a defectiveness metric.

30. A method according to claim 25, said determining an average value including determining a mean of selected pixels within said one or more variably-sized regions.

31. A method according to claim 30, including weighting the average with a defectiveness metric.

32. A method according to claim 31, said averaging including averaging among said subregions weighted so that a center of gravity is coincident with said defective pixel.

* * * * *